(12) United States Patent
Cao et al.

(10) Patent No.: US 9,473,413 B1
(45) Date of Patent: Oct. 18, 2016

(54) DYNAMIC THROTTLE OF NETWORK TRAFFIC

(71) Applicant: Amazon Technologies, Inc., Reno, NV (US)

(72) Inventors: Xiangyu Cao, Renton, WA (US); Stephen Joseph Sherbert, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 394 days.

(21) Appl. No.: 14/097,052

(22) Filed: Dec. 4, 2013

(51) Int. Cl.
| | |
|---|---|
| *G06F 15/16* | (2006.01) |
| *H04L 12/851* | (2013.01) |
| *H04L 12/811* | (2013.01) |
| *G06Q 10/06* | (2012.01) |
| *G06Q 30/02* | (2012.01) |
| *H04L 12/911* | (2013.01) |

(52) U.S. Cl.
CPC .............. *H04L 47/24* (2013.01); *H04L 47/38* (2013.01); *G06Q 10/0633* (2013.01); *G06Q 10/0639* (2013.01); *G06Q 10/06312* (2013.01); *G06Q 30/0201* (2013.01); *H04L 47/70* (2013.01); *H04L 47/78* (2013.01)

(58) Field of Classification Search
CPC ....... H04L 47/10; H04L 67/10; H04L 41/50; H04L 43/08; H04L 47/24; H04L 47/38; H04L 47/78; H04L 47/70; G06F 9/5027; G06F 21/10; G06F 17/3089; G06Q 10/0633; G06Q 10/06312; G06Q 10/0639; G06Q 30/0201
USPC ....... 709/226, 224; 705/37, 14.5, 7.11, 7.12; 726/3; 713/168; 379/112.03; 370/230
See application file for complete search history.

(56) References Cited

U.S. PATENT DOCUMENTS

| | | | | |
|---|---|---|---|---|
| 8,625,757 | B1 * | 1/2014 | Karpov | 379/112.03 |
| 9,246,986 | B1 * | 1/2016 | Ward, Jr. | H04L 67/10 |
| 2008/0243631 | A1 * | 10/2008 | Kane | G06F 17/3089 705/14.5 |
| 2009/0106821 | A1 * | 4/2009 | Kothari | G06F 21/10 726/3 |
| 2012/0221454 | A1 * | 8/2012 | Morgan | G06Q 9/5027 705/37 |
| 2016/0050259 | A1 * | 2/2016 | Banerjee | H04L 67/10 713/168 |

* cited by examiner

*Primary Examiner* — Jungwon Chang
(74) *Attorney, Agent, or Firm* — Kilpatrick Townsend & Stockton LLP

(57) ABSTRACT

Techniques for dynamically throttling network traffic may be provided. For example, a first threshold specific to a first client may be determined and may be dynamically adjusted over time. A volume of network traffic of the first client may be compared to the first threshold and, if is in excess, a throttling operation may be performed. The throttling operation may include throttling the network traffic of the first client, throttling the traffic of a second client, or comparing the volume of network traffic to a second threshold. If the second threshold is exceeded, a connection with the first client or the second client may be terminated.

24 Claims, 7 Drawing Sheets

DYNAMIC THROTTLE OF NETWORK TRAFFIC

BACKGROUND

More and more users are turning to network-based resources to provide and access information. For example, a merchant may list a number of items on a web site. In turn, a customer may view and purchase any of the items via the web site.

To facilitate the interaction between the various users and a network-based resource, a service provider may manage traffic to the network-based resource. For example, the service provider may not only provide users with access to information publicly presented at the network-based resource, but may also control access to private information. To illustrate, a merchant may upload information about an item to a web site. Accordingly, the service provider may list the item for sale, may facilitate a transaction between a customer and the merchant, and may store a record of the transaction. Unlike the description of the item that may be publicly available on the web site, the service provider may upon request retrieve the record and provide a status of the transaction to the merchant and/or the customer. Such and other requests for private information may increase the network traffic for the service provider.

BRIEF DESCRIPTION OF THE DRAWINGS

Various embodiments in accordance with the present disclosure will be described with reference to the drawings, in which.

DETAILED DESCRIPTION

Figure 1:
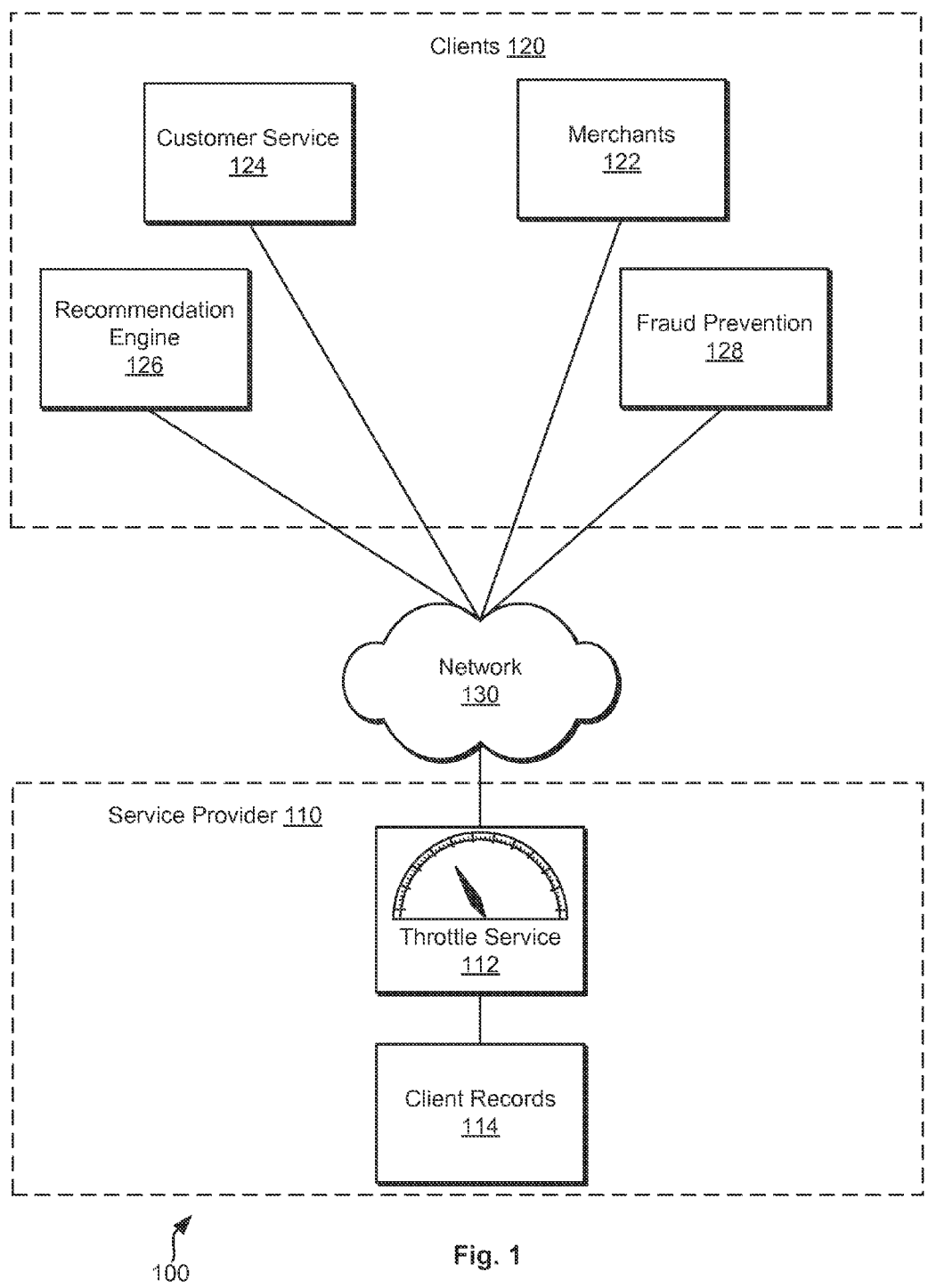
FIG. 1 illustrates an example architecture for dynamically throttling network traffic, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing network traffic. Specifically, techniques herein are directed to dynamically throttling network traffic for a user based at least in part on one or more characteristics of the user. For example, requests for information may increase network traffic for a service provider. However, when a volume of the traffic exceeds resource capacities, the service provider may not be able to respond to the requests. To better manage the network traffic, the service provider may dynamically throttle network traffic for a specific client or for a number of clients and may be configured to dynamically adjust or otherwise update throttle levels for each client individually based at least in part on each client's characteristics.

To illustrate, a merchant may place a number of method calls (e.g., application programming interface (API) calls provided by the service provider) to the service provider to retrieve order information of items offered and/or provided through an electronic marketplace of the service provider. Every Monday between 8:00 am and 9:00 am, the merchant may place a high number of method calls to retrieve order information for items provided on the previous weekend. For the remaining hours of Monday and the weekdays, the merchant may place a lower number of method calls. As such, the service provider can expect a large number of method calls from the merchant every Monday between 8:00 am and 9:00 am and, otherwise, a lower number of calls and can set up a dynamic threshold that may reflect this fluctuation of the method calls over time. The dynamic threshold can be used to throttle the number of method calls from the client such that the service provider may not respond to method calls in excess of the threshold. Because the dynamic threshold may reflect the expected method calls of the merchant over time, the service provider may be able to better serve the needs of the merchant (e.g., responding to the merchant's method calls) by accounting for the fluctuation of the client's needs over time. Additionally, the initial throttle thresholds and any adjustments thereto may be determined based at least in part on characteristics of the merchant (e.g., what types of items does the merchant provide, in what categories do the merchant's items belong, how many items does the merchant have in inventory, how many orders does the merchant fulfill, etc.).

As indicated above, to better manage the network traffic, such as traffic of the client calls, the service provider may throttle network traffic for a specific client or for a number of clients. More specifically, the service provider may configure a service for dynamically throttling the network traffic. The service may analyze and/or identify the characteristics of the client, the network traffic usage history, and/or the network traffic changes to determine a throttle threshold that can be dynamically adjusted over time.

When a client generates a volume of network traffic that exceeds an allocated throttle threshold, the service may manage such traffic using various techniques. In one technique, the service may throttle the network traffic to meet the throttle threshold and may notify the client accordingly. In another technique, the service may allow the network traffic to temporarily exceed the throttle threshold, may request the client to provide an explanation of the excess method calls being received at the service, and/or may throttle the network traffic or dynamically adjust the throttle threshold based at least in part on information received back from the client.

To illustrate, the service may determine that, to retrieve records of sale orders, a merchant places ten method calls per minute each Monday between 8:00 and 9:00 am, and places one method call per hour for the remaining days of the week. As such, the service may dial-up the throttle threshold on Monday mornings such that this threshold may at least allow ten method calls per minute between 8:00 and 9:00 am and may dial-down the throttle threshold for the remaining hours of the week to allow no more than, for example, two method calls per minute. Therefore, method calls placed by the merchant may be served properly at any time of the week. However, if a volume of the method calls exceeds ten method calls per minute on Monday morning or, otherwise, two method calls per minute, the service may either throttle the served method calls to below the respective throttle threshold or may allow a temporary excess. For example, because it may be more critical for the merchant to get the records on Monday morning, the service may respond to all method calls placed between 8:00 and 9:00 am that day but may only respond to two requests per minute at any other time. As used herein, "method calls" and "calls" are to be understood to be synonymous and may include API calls, telephone calls, or any other method for requesting data (e.g., a networked resource) of the service.

Similarly, if the service detects or expects a network change that may impact the network traffic of the client, such as the merchant offering twice the number of items for sale or the service provider increasing its advertising of the items, the service may dynamically adjust the throttle threshold accordingly. In this case, the service may double the throttle threshold to accommodate the expected change.

Further, the service provider may balance needs or requirements of the client with available network resources in order to protect the client and other clients. For example, based on the available network resources, the service may set an upper threshold that cannot be exceeded. When the network traffic of the client or when network traffic collectively from the various clients reaches that upper threshold, the service may determine which of the client(s) needs to be shed such that a volume of the network traffic falls below the upper threshold. This determination may be based on the dynamic throttle threshold and behavior of each client.

To illustrate, if the network resources can respond to twenty calls per minute and if two clients collectively place calls in excess of this threshold, the service may determine which of the two clients is to be shed. For example, at the time of the excess, the first client may have a first throttle threshold of ten calls per minute and the second client may have a second throttle threshold of one call per minute. But if each of the two clients is placing ten calls per minute at that time, the service may decide to shed the second client and to serve the first client. This may be because the first client satisfies the first throttle threshold, whereas the second client exceeds the second throttle threshold by ten folds.

Using the various throttle thresholds, the service provider can ensure a quality of service (QoS) on at least two levels. On a first level, the service provider can dynamically throttle network traffic of a client to meet the client requirements. On a second level, the service provider may shed the network traffic of the client, or of another client, to protect resources of the network such that clients may have an uninterrupted access to information.

FIG. 1 depicts an illustrative computing environment 100 for implementing the techniques described herein. In particular, computing environment 100 may be configured to allow a service provider 110 to control traffic of clients 120 received over a network 130. In the interest of clarity of explanation, an electronic marketplace environment is described herein below. Nevertheless, the described techniques may be implemented in any other computing environment in which traffic between two resources may exist.

Service provider 110 may store information that may be private or uniquely accessible to clients 120 and may provide the information to the clients upon request. When clients 120 request the information by, for example, placing calls to service provider 110 using an application program interface (API), a web-call service, or any method call that may define instructions that a client may follow to connect to a resource of service provider 110 to access and retrieve any of the stored information, such calls may generate traffic between clients 120 and service provider 110. To manage the traffic, service provider 110 may configure a service for dynamically throttling the traffic as further described below.

Service provider 110 may be a provider of an electronic marketplace such as a web site that offers items for sale and may implement the service to support the marketplace. The service may store order information at client records 114 such that clients 120 may have access to the order information at any time. The order information can include, for example, order status, shipping status, cancellation status, refund status, and other information. Clients 120 can include, for example, merchants 122, customer service 124, recommendation engine 126, fraud prevention 128, and other clients.

Each of the clients may have different requirements regarding the type of order information and the frequency at which access to the order information is needed. For example, each of merchants 122 may need to access item orders specific to that merchant (e.g., what items the merchant sold). In comparison, customer service 124 may need to access order information of all merchants 122 to respond to customer inquiries. Similarly, recommendation engine 126 may look up orders of a specific merchant or a specific customer to provide a recommendation (e.g., this item compliments the item you sold/bought). Fraud prevention 128 may query the orders using heuristic methods to determine if a merchant or a customer is fraudulent.

Any of clients 120 may place calls, using an API, a web-service call, to the service, or any other method call to receive order information. The calls can be two ways: a client can, for example, download order reports (e.g., a structured report showing what items were sold) and upload statuses (e.g., updating records that items were shipped). In addition, clients 120 may have different requirements about the number and frequency of placed calls. For example, a merchant may place a high volume of calls every Monday morning to determine a status of item orders, whereas fraud prevention 128 may place an even higher volume of calls but on a monthly basis across all merchants 122 and customers. Similarly, the size of the data requested by the calls (e.g., order information) may vary between clients 120. For example, the size of the data requested by fraud prevention 128 may be larger than the size of the data requested by a merchant because fraud prevention 128 may place calls to access order information of multiple merchants. In another example, the size of the data requested by a merchant may vary depending on the number of sold items of the merchant and/or the time of the week when the calls are placed. This is because, the more items are sold, the larger the size of the order information may be. A volume of traffic associated with calls from clients 120 may represent any or a combination of the number of the calls, the frequency of the calls, or the size of the requested data by the calls.

Service provider 110 may configure the service to meet the various requirements of clients 120 such that responses to client calls can be returned on time. The responses may include the requested order information, while the timing of the responses may not exceed a predefined window of time. This time window may be driven by an agreed upon QoS. For example, access of merchants 122 to order information may be time critical. As such, service provider 110 may agree to respond to merchant calls within a minute to ensure that merchants 122 have timely order information.

Because the volume of traffic associated with client calls may not only vary between clients 120, but may also vary across all clients 120 over time, service provider 110 may further configure the service to account for the variable and asynchronous reception of client calls. In particular, the service may implement a throttle service 112 configured to manage the traffic from clients 120, such as the client calls.

In a basic configuration, throttle service 112 may throttle the traffic. This throttling may include, for example, adjusting a rate at which service provider 110 may respond to client calls, adjusting a rate at which clients 120 may place calls, not responding to client calls, denying access to data requested by the calls, and/or notifying a client when throttling occurs. In some situations, throttle service 112 may shed a client that has an excessive volume of traffic. Shedding a client may include terminating a connection with the client, requesting and causing a node or switch on the network to block calls from the client, and/or notifying the client of the shedding. Throttle service 112 may optimize available resources of service provider 110 for processing client calls, and may prevent potential unsustainable consumption of resources by clients 120. As such, service provider 110 may configure throttle service 112 to prevent the available resources from becoming overloaded such as to avoid resource failures.

Further, throttle service 112 may dynamically throttle the traffic. Dynamic throttling may include dynamically adjusting the above rates over time based on characteristics of the client, the available resources, and/or other parameters. To do so and as is further described herein below, throttle service 112 may determine dynamic thresholds adjustable over time and may set the above rates to not exceed these thresholds. For example, for a client of clients 120, throttle service 112 may analyze a history of placed calls to determine a pattern of calls. Accordingly for a client, throttle service 112 may set a dynamic threshold for that client as a function of the pattern over time. Additionally or alternatively, throttle service 112 may analyze changes to resources and/or services of service provider 110 and the client to determine expected changes to the volume and rate of the calls and may set the dynamic threshold as a function of the expected changes over time.

Throttle service 112 may determine a dynamic threshold that may be specific to each client of clients 120. To do so, and for a client, throttle service 112 may consider any or a combination of characteristics of the client. These characteristics may include, for example, a volume of traffic associated with calls received from the client (e.g., number of calls, frequency of calls, size of the requested data by the calls), requirements of the client (e.g., e.g., the urgency and importance of responding to the data in a timely manner, requirements agreed to in a contract), a type of the client (e.g., whether on a preferred client list or not), business nature of the client (e.g., inventory size of items offered by the client, amount of items sold, number of customers of the client), and other client-related characteristics. Also, throttle service 112 may consider characteristics of other clients when determining the dynamic threshold of the client.

A dynamic threshold allocated to a client may be dynamically adjusted over time based on, for example, any or a combination of characteristics of the client. In other words, a value of the dynamic threshold at one point in time may be different from a value of the dynamic threshold at another point in time to account for the needs of the client. For example, if the client places additional calls or requests larger data compared to previous calls from the client, throttle service 112 may increase the dynamic threshold from an initial value to a larger value. In this way, instead of throttling the client to the initial value, throttle service 112 may throttle the traffic to the larger value such that some or all of the additional calls may be processed based on the larger value of the dynamic threshold. Throttle service 112 may also dynamically adjust the dynamic threshold of the client based on characteristics of the other clients and/or available resources. In this way, throttle service 112 may also balance the needs of the various clients and the available bandwidth.

A dynamic threshold may include multiple thresholds, each of which can be dynamically adjusted over time. For example, the dynamic threshold may include a request per time unit threshold and a burst threshold. Throttle service 112 may use the request per time unit threshold to limit client calls per unit of time (e.g., the volume of calls that can be placed within a minute). In comparison, throttle service 112 may use the burst threshold to limit spikes in client calls (e.g., within a short period of time, the volume of calls can reach but not exceed a volume that is larger than the average).

In addition to dynamically throttling the traffic, throttle service 112 may provide clients 120 with tools that give visibility of the dynamic throttling and of the call volumes. For example, throttle service 112 may generate alarms and notify a client when the client's call volume approaches an allocated dynamic threshold. Similarly, throttle service 112 may provide information about the allocated dynamic threshold to the client such that the client can update scripts used to place calls (e.g., the client's API code may be updated to place calls at rates that meet the allocated dynamic threshold). The visibility tools may allow client 120 to provide feedback to throttle service 112. Such feedback may include, for example a request to adjust allocated dynamic thresholds.

By implementing dynamic throttling, service provider 110 may protect resources and ensure that client needs are met. Unlike situations where no throttling is employed, dynamic throttling may optimize resource usage and avoid resource failures. Also, unlike situations where static thresholds are employed, dynamic thresholds may allow a simpler deployment of scripts (e.g., API call scripts) and minimize updates to deployed scripts to meet variable needs of clients 120 over time.

As illustrated in FIG. 1, when service provider 110 receives calls from clients 120 for order information stored at client records 114, throttle service 112 may dynamically throttle the calls. For example, throttle service 112 may generate and allocate a dynamic threshold for each client. When a client calls client records 114 in excess of the allocated dynamic threshold, throttle service 112 may perform a number of operations based on, for example, any or a combination of characteristics of the client. These operations may include throttling calls of the client, throttling calls of another client, adjusting the dynamic threshold(s), and/or notifying client(s) of the throttling. These and other operations are further described in the figures below.

Figure 2:
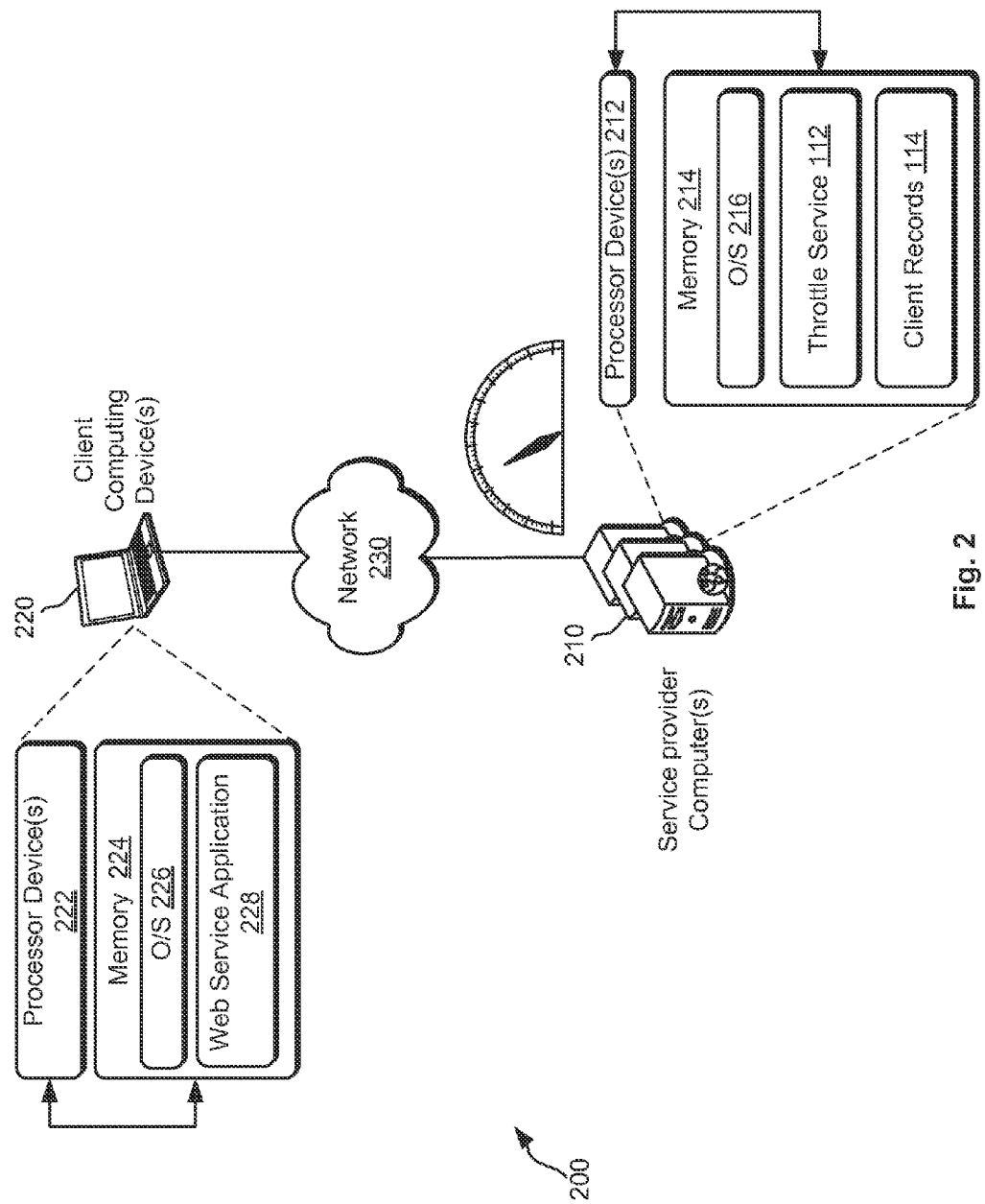
FIG. 2 illustrates an example architecture for dynamic throttling, including at least one user device and/or one or more service provider computers connected via one or more networks, according to embodiments.

Turning to FIG. 2, that figure illustrates an example end-to-end computing environment 200 for dynamically throttling traffic between clients and a service provider. In this example, a service provider (such as service provider 110 of FIG. 1) may implement a throttle (such as throttle service 112 of FIG. 1) part of a network-based resource or a marketplace available to clients (such as clients 120 of FIG. 1).

In a basic configuration, one or more clients (which may be referred to herein in the singular as "client" or in the plural as "clients") may utilize one or more client computing devices 220 (which may be referred to herein in the singular as "computing device 220" or in the plural as "computing devices 220") to access local applications, a web service application 228, a client account accessible through the web service application, or a web site or any other network-based resources via one or more networks 230 (which may be referred to herein in the singular "network 230" or in the plural "networks 230"). In some aspects, web service application 228, the web site, and/or the client account may be hosted, managed, and/or otherwise provided by one or more computing resources of the service provider that may implement throttle service 112, such as by utilizing one or more service provider computers 210 (which may be referred to herein in the singular as "service provider computer 210" or in the plural as "service provider computers 210").

The clients may use the local applications and/or web service application 228 to conduct transactions with the network-based resources of the service provider. These transactions may include, for example, offering items for sale, receiving order information for the items, and other types of transactions.

In some examples, client computing devices 220 may also be any type of computing devices such as, but not limited to, a mobile phone, a smart phone, a personal digital assistant (PDA), a laptop computer, a thin-client device, a tablet PC, and other types of computing devices. In one illustrative configuration, client computing devices 220 may contain communications connection(s) that allow client computing devices 220 to communicate with a stored database, another computing device, servers, user terminals, and/or other devices on networks 230. Client computing devices 220 may also include input/output (I/O) device(s) and/or ports, such as for enabling connection with a keyboard, a mouse, a pen, a voice input device, a touch input device, a display, speakers, a printer, etc.

Client computing devices 220 may also include at least one or more processing units (or processor device(s)) 222 and one memory 224. Processor device(s) 222 may be implemented as appropriate in hardware, computer-executable instructions, firmware, or combinations thereof. Computer-executable instruction or firmware implementations of processor device(s) 222 may include computer-executable or machine-executable instructions written in any suitable programming language to perform the various functions described.

Memory 224 may store program instructions that are loadable and executable on processor device(s) 222, as well as data generated during the execution of these programs. Depending on the configuration and type of computing devices 220, memory 224 may be volatile (such as random access memory (RAM)) and/or non-volatile (such as read-only memory (ROM), flash memory, etc.). Client computing devices 220 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, memory 224 may include multiple different types of memory, such as static random access memory (SRAM), dynamic random access memory (DRAM), or ROM.

Turning to the contents of memory 224 in more detail, the memory may include an operating system (O/S) 226 and the one or more application programs or services for implementing the features disclosed herein including web service application 228. In some examples, client computing devices 220 may be in communication with service provider computers 210 via networks 230, or via other network connections. Networks 230 may include any one or a combination of many different types of networks, such as cable networks, the Internet, wireless networks, cellular networks, and other private and/or public networks. While the illustrated example represents clients accessing web service application 228 over networks 230, the described techniques may equally apply in instances where the clients interact with service provider computers 210 via client computing devices 220 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, web service application 228 may allow clients to interact with service provider computers 210 to conduct transactions. Service provider computers 210, perhaps arranged in a cluster of servers or as a server farm, may host web service application 228. These servers may be configured to host a web site (or combination of web sites) viewable via computing devices 220. Other server architectures may also be used to host web service application 228. Web service application 228 may be capable of handling requests from many clients and serving, in response, various interfaces that can be rendered at computing devices 210 such as, but not limited to, a web site. Web service application 228 can interact with any type of web site that supports interaction, including social networking sites, electronic retailers, informational sites, blog sites, search engine sites, news and entertainment sites, and so forth. As discussed above, the described techniques can similarly be implemented outside of web service application 228, such as with other applications running on computing devices 220.

Service provider computers 210 may, in some examples, provide network-based resources such as, but not limited to, applications for purchase and/or download, web sites, web hosting, client entities, data storage, data access, management, virtualization, etc. Service provider computers 210 may also be operable to provide web hosting, computer application development, and/or implementation platforms, or combinations of the foregoing to clients.

Service provider computers 210 may be any type of computing device such as, but not limited to, a mobile phone, a smart phone, a personal digital assistant (PDA), a laptop computer, a desktop computer, a server computer, a thin-client device, a tablet PC, etc. Service provider computers 210 may also contain communications connection(s) that allow service provider computers 210 to communicate with a stored database, other computing devices, servers, user terminals, and/or other devices on network 230. Service provider computers 210 may also include input/output (I/O) device(s) and/or ports, such as for enabling connection with a keyboard, a mouse, a pen, a voice input device, a touch input device, a display, speakers, a printer, etc.

Additionally, in some embodiments, service provider computers 210 may be executed by one or more virtual machines implemented in a hosted computing environment. The hosted computing environment may include one or more rapidly provisioned and released network-based resources, which network-based resources may include computing, networking, and/or storage devices. A hosted computing environment may also be referred to as a cloud computing environment. In some examples, service provider computers 210 may be in communication with client computing devices 220 via networks 230, or via other network connections. Service provider computers 210 may include one or more servers, perhaps arranged in a cluster, or as individual servers not associated with one another.

In one illustrative configuration, service provider computers 210 may include at least one or more processing units (or processor devices(s)) 212 and one memory 214. Processor device(s) 212 may be implemented as appropriate in hardware, computer-executable instructions, firmware, or combinations thereof. Computer-executable instruction or firmware implementations of processor device(s) 212 may include computer-executable or machine-executable instructions written in any suitable programming language to perform the various functions described.

Memory 214 may store program instructions that are loadable and executable on processor device(s) 212, as well as data generated during the execution of these programs. Depending on the configuration and type of service provider computers 210, memory 214 may be volatile (such as random access memory (RAM)) and/or non-volatile (such as read-only memory (ROM), flash memory, etc.). Service provider computers 210 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, memory 214 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of memory 214 in more detail, the memory may include an operating system (O/S) 216, a service for dynamically throttling traffic (such as throttle service 112 of FIG. 1), and information accessible to clients (such as client records 114 of FIG. 1). The service provider may configure the service to dynamically throttle traffic of the clients, including client calls for information and response thereto. Although FIG. 2 illustrates the information accessible to clients as stored in memory 214, this information may be additionally or alternatively stored at a storage device remotely accessible to service provider computers 210. Configurations and operations of throttle service 112 are further described in greater detail below with reference to at least FIGS. 3-6.

FIGS. 3-6 illustrate example flows that can be implemented to dynamically throttle traffic over a network as described above in FIGS. 1-2. In the interest of clarity of explanation, service provider computer 210 is described in FIGS. 3-6 as performing the flows. However, various components of service provider computer 210 may be configured to dynamically throttle the network traffic according to the example flows of FIGS. 3-6. These components may include, for example, throttle service 112 for implementing the dynamic throttling and client records 114 for storing the information requested by clients. Nevertheless, other components or combination of components can be used and should be apparent to those skilled in the art.

Further, the example flows of FIGS. 3-6 may be embodied in, and fully or partially automated by, code modules executed by one or more processor devices of service provider computer 210. The code modules may be stored on any type of non-transitory computer-readable medium or computer storage device, such as hard drives, solid state memory, optical disc and/or other non-transitory medium. The results of the operations may be stored, persistently or otherwise, in any type of non-transitory computer storage such as, e.g., volatile or non-volatile storage. Also, while the flows are illustrated in a particular order, it should be understood that no particular order is necessary and that one or more operations or parts of the flows may be omitted, skipped, and/or reordered. Additionally, one of ordinary skill in the art will appreciate that client computing devices 220 may perform corresponding operations to provide information to the clients.

Figure 3:
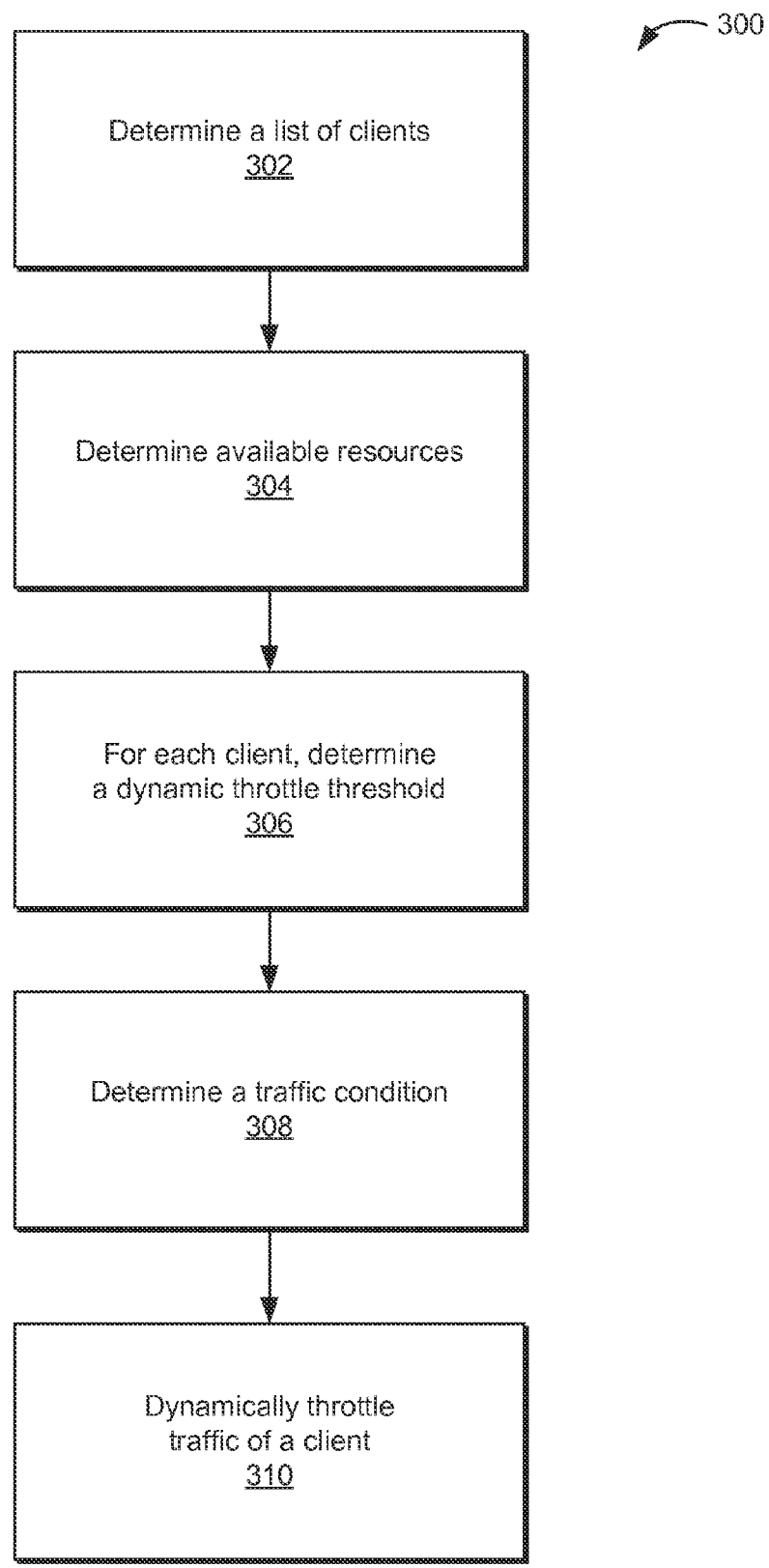
FIG. 3 illustrates an example flow for dynamically throttling network traffic, according to embodiments.

Turning to FIG. 3, that figure illustrates an example flow 300 that may be implemented to dynamically throttle network traffic including determining and applying dynamic thresholds.

Flow 300 may start at operation 302, where service provider computer 210 may determine a list of clients. For example, each client may be required to subscribe to services of service provider computer 210 and may have an associated client account. As such, service provider computer 210 may determine the list based on the client accounts.

In addition to allowing service provider computer 210 to determine which client(s) dynamic throttling may be applied to, operation 302 may also allow service provider computer 210 to tailor a certain level of throttling services for each client. This tailoring may be based on a number of characteristics of the client. For example, the client list may include a preferred client list and a non-preferred client list. Based on a behavior of a client with respect to a frequency at which the client's calls need to be throttled or not, service provider computer 210 may add the client to the preferred or non-preferred client list. To illustrate, a client that rarely requires throttling may be added to the preferred client list, whereas a client that usually requires throttling may be added to the non-preferred list. When traffic of multiple clients' needs to be dynamically throttled, service provider computer 210 may initially throttle traffic of a client on the non-preferred list, and only if needed, may subsequently throttle traffic of a client on the preferred list.

At operation 304, service provider computer 210 may determine available resources including, for example, resources of service provider computer 210 that may be committed to serving the traffic of the clients (e.g., network resources configured to receive client calls, access order information, and respond to the client calls). This operation may allow service provider computer 210 to account for any bandwidth availability or constraints when dynamically throttling the traffic. As further described below, this operation may also allow service provider computer 210 to determine a global threshold to protect the resources against overloading. For example, service provider computer 210 may throttle, or even shed clients (e.g., apply load shedding that may terminate a client connection) to ensure that the volume of the traffic does not exceed the global threshold.

Figure 4:
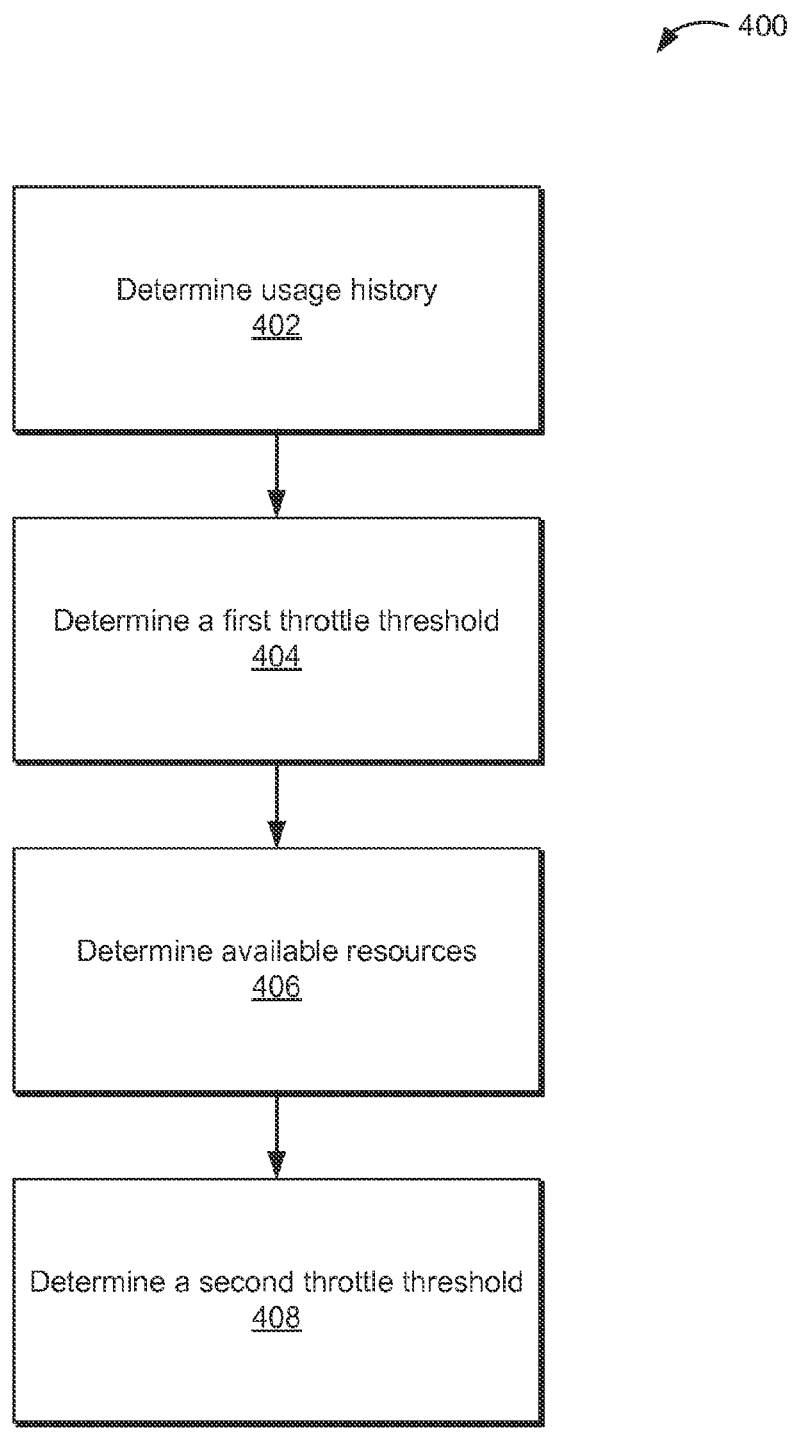
FIG. 4 illustrates an example flow for determining throttle thresholds, according to embodiments.
Figure 5:
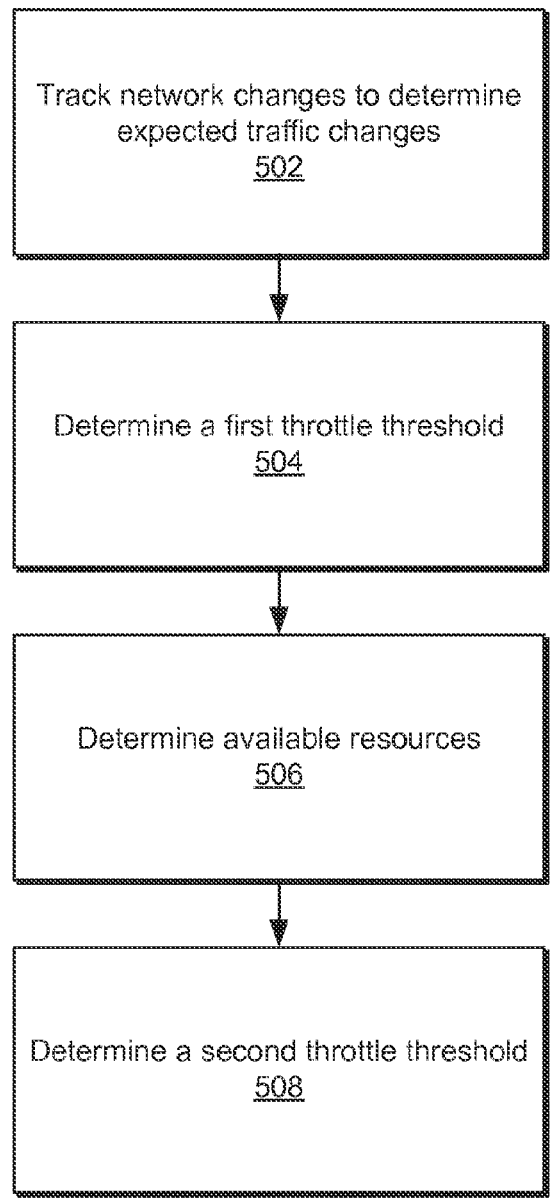
FIG. 5 illustrates another example flow for determining throttle thresholds, according to embodiments.

At operation 306, service provider computer 210 may determine a dynamic throttle threshold for each client. For a client, this determination may not be only based on a number of characteristics of a client, but may also be based on a number of characteristics of other clients. FIGS. 4 and 5 further describe this determination using examples of analyzing usage history, network changes, and service changes of the clients. Generally, a dynamic throttle threshold may be dynamically adjustable over time and may include a limit that, when exceeded, may trigger service provider computer 210 to perform one or more throttling operations. When dynamically adjusting a dynamic threshold of a client, service provider computer 210 may consider a number of characteristics of the client and/or of other clients.

Further, at operation 306, service provider computer 210 may provide visibility tools to the clients. In an example, service provider computer 210 may integrate the visibility tools into the client accounts. For instance, a field within a client account may be used to inform a client of the allocated dynamic throttle threshold. As such, the client may have access to information about the dynamic throttle threshold.

At operation 308, service provider computer 210 may determine a traffic condition. For example, service provider computer 210 may determine a volume of network traffic such as a rate at which calls per time unit and/or a burst rate for calls received at service provider computer 210. Said differently, the condition may be associated with a volume of network traffic of a single client or of a plurality of clients.

At operation 310, service provider computer 210 may dynamically throttle traffic of a client based on the traffic condition. For example, when a volume of traffic of the client, another client, or the clients collectively exceeds dynamic throttle thresholds and/or the global threshold, service provider computer 210 may perform various throttling operations at least at two levels.

At a first level, service provider computer 210 may perform operations specific to a single client. These operations may include throttling network traffic of that client, adjusting the dynamic throttle threshold of the client, and/or notifying the client that the allocated dynamic throttle threshold is adjusted and/or that the network traffic is throttled. The notification may use the same visibility tools as above and may inform the client of the volume of the client traffic and/or the reason for performing a throttle operation(s).

To determine which operation(s) to perform, service provider computer 210 may apply a combination of factors that may be based on a number of characteristics of the clients. For example, in a first factor, service provider computer 210 may compare the dynamic throttle threshold of the client to the volume of the client's network traffic (e.g., to quantify the excess of the client traffic volume). In a second factor, service provider computer 210 may determine if a resource has an available bandwidth that can be committed to the client's network traffic (e.g., whether the excess can be handled without overloading the resources). In a third factor, service provider computer 210 may assess how traffic volumes of other clients meet the dynamic throttle thresholds of these clients (e.g., to determine if another client has a traffic volume in excess, or if the volume is not in excess, whether the dynamic throttle threshold of that client indicates that the traffic volume of the client may increase or decrease). In a fourth factor, service provider computer 210 may apply rules associated with the preferred and non-preferred client lists (e.g., a rule that requires throttling traffic of a client on the non-preferred client list before throttling traffic of a client on the preferred client list). These four factors, and other factors, may allow service provider computer 210 to perform an operation(s) that best meets the needs of all of the clients.

To illustrate, if service provider computer 210 determines that, for a client, traffic volume exceeds the dynamic throttle threshold of the client, that there is no available bandwidth to process the excess, that the client is a non-preferred list, and that traffic volumes of other clients meet the dynamic throttle thresholds of each of the other clients, service provider computer 210 may throttle the traffic of the client to a rate lower than the dynamic throttle threshold. In contrast, if the client is on the preferred client list and there is available bandwidth, service provider computer 210 may not throttle the traffic of the client. Instead, service provider computer 210 may temporary allow the excess, commit the available bandwidth to process the excess, and notify the client accordingly. If the client responds to the notification with a reason for the excess, service provider computer 210 may adjust the dynamic throttle threshold accordingly. In another example, if the client is on the preferred list but there is no available bandwidth to process the excess, service provider computer 210 may throttle the network traffic of another client that is on the non-preferred list, and may commit the freed-up bandwidth to process the excess. These examples are not exhaustive. Instead, service provider computer 210 may implement other combinations of operations based on other combinations of the factors.

At a second level, service provider computer 210 may perform operations across multiple clients or even across the entire client base. At this level, service provider computer 210 may protect resources from overloads by applying the global threshold. In other words, service provider 210 may control the collective traffic volume of the clients to be less than the global threshold. To do so, service provider computer 210 may consider the above factors and perform similar throttling operations as described above. Additionally, service provider computer 210 may perform client shedding operations to avoid overloading the resources.

To illustrate, if the collective traffic volume of the clients approaches the global threshold, service provider computer 210 may compare the traffic volume of each client to the corresponding dynamic throttle threshold and may shed one or more clients that have excessive traffic volumes. In another example, the shedding may take into account whether a client is on the preferred list or not. For instance, if one of two clients should be shed and one of the two clients is on the preferred list, the connection of the client that is not on this list may be shed.

Turning to FIG. 4, that figure illustrates an example flow 400 that may be implemented to determine and adjust a dynamic throttle threshold for a client based on a history of the client's traffic. The history of the client's traffic may be an example of a characteristic of the client. Flow 400 may include example implementations of operation 306 of flow 300. In the interest of clarity of explanation, flow 400 is described as determining the dynamic throttle threshold for a single client. Nevertheless, service provider computer 210 may implement flow 400 to determine dynamic throttle thresholds for a plurality of clients.

Flow 400 may start at operation 402, where service provider computer 210 may determine a usage history of the client. The usage history may include, for example, a history of the client's traffic such as a history of the client calls. At this operation, service provider computer 210 may store data indicative of the client calls as part of the process of receiving and processing the calls. The data may include rates of calls per time unit and burst rates. For example, if the client places ten calls per minute every Monday between 8:00 am and 9:00 and one call per minute during the remaining hours of the week, service provider computer 210 may store such usage data when the calls are received.

At operation 404, service provider computer 210 may determine a first threshold. The first threshold may include a dynamic throttle threshold that can be expressed as function of time. In other words, the dynamic throttle threshold can dynamically be adjusted over time. At this operation, service provider computer 210 may analyze the usage data to generate the first threshold. In one example, service provider computer 210 may determine and use an average rate and a standard deviation and set the dynamic throttle threshold accordingly. For instance, the dynamic throttle threshold may be set as a range centered over the average rate and bounded to the standard deviation from that center. As such, any traffic with a volume within that range may not be throttled. But traffic with a volume that exceeds the upper end of the range may be throttled.

In another example, service provider computer 210 may analyze the usage data to locate patterns in the data. Any appropriate pattern matching or data analysis algorithm can be used for the analysis. For each pattern, service provider computer 210 may determine a level of certainty, frequency, or other metric. If a pattern meets a predefined criteria (e.g., the level of certainty is over 90%), that pattern can be used to set the dynamic throttle threshold. To illustrate, and referring to the example above, service provider computer 210 may determine with almost a 100% certainty that the client places ten calls per minute on Monday between 8:00 am and 9:00 am and, otherwise, one call per minute. As such, service provider computer 210 may set the dynamic throttle threshold to mirror or meet this pattern. For instance, service provider computer 210 may set the dynamic throttle threshold to ten calls per minute or more on Monday between 8:00 am and 9:00 am and may adjust the dynamic throttle threshold to one call per minute or more for the remaining hours of the week.

Additionally at this operation, service provider computer 210 may not only notify the client of the first threshold as described herein above, but may also allow the client to agree to uses of the first threshold. For example, service provider computer 210 may update the client account with the first threshold, may present the update to the client using an interface, and may configure the interface to receive consent from the client to the first threshold. Additionally or alternatively, the interface may allow the client to propose an update to the first threshold (e.g., increase or decrease), to which the service provider may agree. If agreed, service provider computer 210 may adjust the first threshold accordingly. Although an interface is described as a means for agreeing to and adjusting the first threshold, other means may be used such as, for example, a formal agreement negotiated and entered between the service provider and the client.

At operation 406, service provider computer 210 may determine available resources. The available resources may include resources uniquely committed to processing calls of the client and/or resources committed to other clients. At operation 408, service provider computer 210 may determine a second throttle threshold based on the available resources. This second throttle threshold may be a global threshold that the client may not exceed, may typically be higher than the first threshold, and need not be dynamically adjustable for the client. At this operation, service provider computer 210 may also notify the client of the second threshold by using, for example, the client account and the interface described herein above.

As such, by using two thresholds, service provider computer 210 may in some situations allow the client to have a traffic volume that exceeds the first dynamic throttle threshold (e.g., no throttling is applied to the excess) while also protecting the resources from overload. The resources may be protected because the traffic volume may not exceed the second threshold.

Turning to FIG. 5, that figure illustrates an example flow 500 that may be implemented to determine and adjust a dynamic throttle threshold for a client based on expected changes associated with the network traffic. Expected changes associated with network traffic may be examples of characteristic of clients. Flow 500 may include example implementations of operation 306 of flow 300. In the interest of clarity of explanation, flow 500 is described as determining the dynamic throttle threshold for a single client. Nevertheless, service provider computer 210 may implement flow 500 to determine dynamic throttle thresholds for a plurality of clients. Further, some operations or steps within the operations of flow 500 may be similar to those of flow 400. In the interest of clarity of explanation, such similarities are not repeated herein below.

Flow 500 may start at operation 502, where service provider computer 210 may track a network change(s). Because network changes may impact network traffic of clients, service provider computer 210 may use the tracked network changes to determine expected changes to the network traffic. For example, an increase in a service of a client may result in an expected increase in the client calls. Similarly, a decrease in bandwidth at one resource may result in an expected increase of client calls to another resource.

A network change may include changes to resources configured to process the network traffic between the clients and the service providers. A network change may also include changes to services offered by the service provider and/or the clients. For example, the service provider may increase resources, and thus may have more bandwidth. As such, dynamic throttle thresholds allocated to the clients may be increased. In another example, a client may deploy a script that places calls at a higher frequency than before. Or, the client needs may increase, such as when a merchant may offer more items for sale and may need to access order information more frequently. In such situations, a higher dynamic throttle threshold may be used.

Service provider computer 210 may track and detect these and other network changes and may determine the expected changes to the network traffic using a combination of various techniques. In an example, service provider computer 210 may apply similar usage history analysis as above but to a usage history of the resources. For example, service provider computer 210 may determine a pattern of resource usage, and based on the pattern, may determine a growth. This growth may be set as an expected change. To illustrate, if over a period of six months, service provider computer 210 determines a pattern of 5% network traffic increase on a monthly basis, service provider computer 210 may expect a 5% of future network traffic increase per month.

In another example, service provider computer 210 may monitor scheduled changes, maintenances, or milestones. For example, a planned addition of a new client, a temporary outage of a resource for maintenance purposes, or an arranged increase or decrease in service availability may be determined and impact to available bandwidth may be assessed accordingly.

In a further example, service provider computer 210 may allow the service provider or the clients to provide input describing changes to the network. For example, service provider computer 210 may present an interface configured to allow such an input. The service provider and/or a client may have firsthand knowledge of an expected change and may use the interface to request updates to the throttling of the network traffic. To illustrate, a merchant may use an interface to not only communicate a launch of a new function to the service provider, but to also request an adjustment to an allocated dynamic throttle threshold. Similarly, the service provider may expect an increase in the volume of calls from customer services to records associated with the new function in order to help customers. As such, the service provider may use an interface to request a temporary increase to a dynamic throttle threshold allocated to customer services.

In yet another example, service provider computer 210 may implement A/B testing algorithms, where service provider computer 210 may identify an impact to the network traffic based on changes to the resources or services. For example, for a client, service provider computer 210 may commit an initial bandwidth, process client calls using the initial bandwidth, subsequently commit a second bandwidth (e.g., a larger bandwidth), process client calls from the client using the second bandwidth, and compare the impact of the initial and second bandwidths to the processing of the client calls. Based on this impact, service provider computer 210 may project the changes to the network traffic (e.g., the processing of client calls) as a function of allocated bandwidth.

To illustrate, using a combination of the above techniques, service provider computer 210 may determine that a client has a history of a 5% traffic increase on a monthly basis and is planning to double a volume of the services in six months. As such, service provider computer 210 may expect an increase of 5% in network traffic in the next five months, 100% increase at the sixth month, and 5% increase from that point on. Service provider computer 210 may plot this expected traffic change as a function of time.

At operation 504, service provider computer 210 may determine a first threshold based on the expected changes to the network traffic. The first threshold may include a dynamic throttle threshold that can be expressed as a function of time. If service provider computer 210 expects an increase in calls from a particular client over time, service provider computer 210 may adjust (e.g., increase) the first threshold of that client from an initial value or may set the first threshold to a value higher than the expected call volume. Similarly, the service provider computer 210 may adjust (e.g., decrease) the dynamic throttle threshold when the call volume is expected to decrease. To illustrate and continuing with the previous example, service provider computer 210 may set the first threshold as a function that mirrors or exceeds the plotted expected traffic change. For example, service provider computer 210 may set the first threshold to at least a 5% increase over an initial value, may increase the first threshold by a 100% at the sixth month, and may further increase the first threshold by 5% from that point on.

At this operation, service provider computer 210 may also balance the first threshold with characteristics of other clients. For example, if the volume of the expected traffic change is higher than what the resources can handle, service provider computer 210 may consider whether a second client has an expected decrease in traffic volume that may allow an increase to the first threshold. Also, service provider computer 210 may consider whether the two clients are on the preferred and non-preferred lists. If the client is on the preferred list and the second client is on the non-preferred list, service provider computer 210 may increase the first threshold of the client while decreasing the threshold of the second client by a corresponding amount.

Also at this operation, service provider computer 210 may present the first threshold to the service provider and/or the client using an interface. The interface may be configured to also accept updates to the first threshold. For example, the client may adjust the first threshold at the sixth month to have a different value than the 100% expected increase.

At operation 506, service provider computer 210 may determine available resources. This operation may be similar to operation 406 of flow 400. The determination may also include the expected resource availability as described above. At operation 508, service provider computer 210 may determine a second throttle threshold based on the available resources. This operation may be similar to operation 408 of flow 400. The second throttle threshold may be a global threshold that the client may not exceed. As such, by projecting the needs of the client and the available resources over time and using the two thresholds, service provider computer 210 may dynamically throttle the traffic of the client over time based on the expected client needs while also protecting the resources based on the expected resource availability.

Although flows 400 and 500 are described as separate flows, the two flows can be used in conjunction or combined. For example, for a client, a dynamic throttle threshold determined based on flow 400 may be further updated and adjusted based on flow 500.

Figure 6:
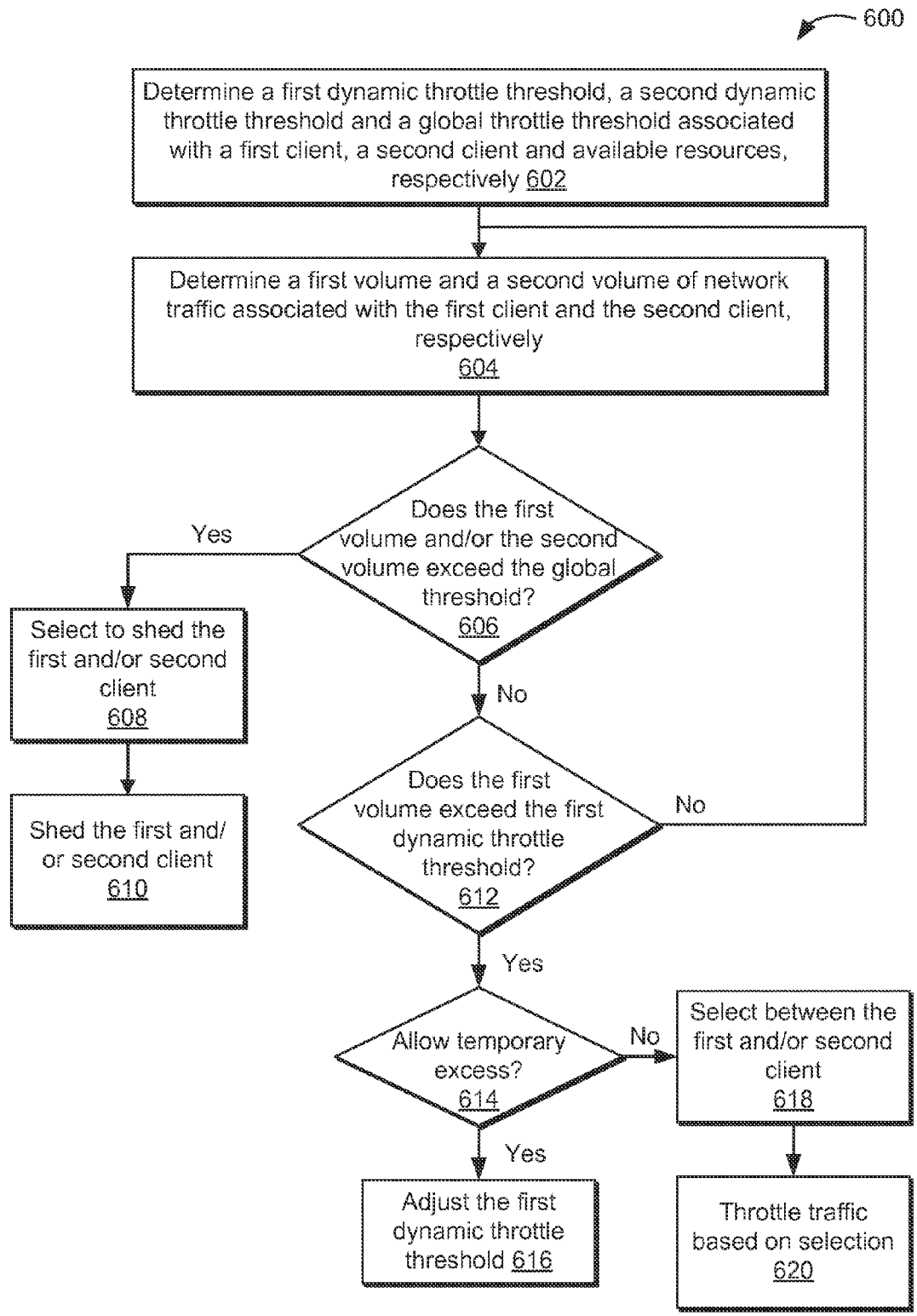
FIG. 6 illustrates an example flow for dynamically applying throttle thresholds, according to embodiments.

Once dynamic throttle thresholds and global thresholds are determined for various clients, service provider computer 210 may dynamically throttle the network traffic of these clients accordingly. FIG. 6 illustrates an example flow 600 that may be implemented to dynamically throttle network traffic of a client based on thresholds associated with the client and other clients. In the interest of clarity of explanation, flow 600 is described as dynamically throttling network traffic of a single client. Nevertheless, service provider computer 210 may implement flow 600 to dynamically throttling network traffic of a plurality of clients.

Flow 600 may start at operation 602, where service provider computer 210 may determine thresholds associated with a plurality of clients. In particular, service provider computer 210 may determine a first dynamic throttle threshold allocated to a first client, a second dynamic throttle threshold allocated to a second client, and a global threshold that may depend on the available resources. Each of these thresholds may have been derived and stored using a combination of flows 400 and 500 and may be retrieved from storage accordingly.

At operation 604, service provider computer 210 may determine a volume of the network traffic. This volume may include a first volume associated with the first client, a second volume associated with the second client, and other network traffic volumes. For example, service provider computer 210 may determine for the first and second clients, the number of placed calls the rate at which these calls are placed, and/or the size of the data requested by the calls.

At operation 606, service provider computer 210 may determine whether the volume of the network traffic exceeds the global threshold. For example, service provider computer 210 may compare the first volume, the second volume, or a combination of the first and second volumes to the global threshold. If the volume exceeds the global threshold, operation 608 may be performed. Otherwise, operation 612 may be performed.

At operation 608, service provider computer 210 may select to shed one or more clients. This is because the volume of the network traffic exceeds the global threshold and, in response, service provider computer 210 may need to protect network resources from overload. At this operation, service provider computer 210 may use various factors, as the ones described above, to select, for example, the first client and/or second client for shedding and may notify the selected client(s) of the imminent shedding. To illustrate, if the first volume exceeds the global threshold but the second volume does not, service provider computer 210 may select the first client. Or, if the first client is on the preferred client list and the second client is on the non-preferred list, the service provider computer 210 may select the second client. These and other selections may be possible based on a combination of the considered factors.

At operation 610, service provider computer 210 may shed the selected one or more clients. For example, service provider computer 210 may terminate a connection with the first client and/or the second client based on the selection at operation 608.

At operation 612, service provider computer 210 may determine whether the first volume of network traffic exceeds the first dynamic throttle threshold by comparing, for example, the first volume to the first dynamic threshold. If the first volume exceeds the first dynamic threshold, operation 614 may be performed. Otherwise, service provider computer 210 may determine that the traffic of the first client need not be throttled and may return to operation 604 to keep monitoring this traffic. Although operation 612 is illustrated within the context of the first client, service provider computer 210 may similarly determine whether the second client and other clients have traffic volumes that exceed the respective dynamic thresholds.

At operation 614, service provider computer 210 may determine whether the excess traffic volume can be allowed. This determination may enable the service provider to account for specific characteristics of the clients by allowing, for example, exceptions to the throttling. At this operation, service provider computer 210 may again consider a combination of the above factors to perform the determination. For example, if bandwidth is available service provider computer 210 may allow the excess. Likewise, if the first client is on the preferred client list, service provider computer 210 may allow the excess and, as needed, may throttle traffic of other clients that may not be on the preferred client list. If the excess is allowed, operation 616 may be performed. Otherwise, operation 618 may be performed.

At operation 616, service provider computer 210 may allow the excess temporary and may, as needed, adjust the first dynamic throttle threshold. More particularly, service provider computer 210 may perform at least three operations: set the period of time during which the excess is allowed, notify the client, and adjust the first dynamic throttle threshold accordingly. For example, the period of time may be an estimated timeframe sufficient to analyze a reason for the excess. This timeframe may include, for example, the time needed to notify the first client, receive a reason back, and determine the validity of the reason. Or, the timeframe may include the time needed to access and analyze a script that the first client uses to place the calls.

Notifying the client may include updating the client account with a description of the excess and the temporary allowance and contacting the client (e.g., via email). If a valid reason for the excess is determined, service provider computer 210 may increase the dynamic throttle threshold. For example, if service provider computer 210 determines that the first client justifiably has twice the volume of traffic, service provider computer 210 may double the first dynamic throttle threshold. However, if no valid reason is determined, or if the first client fails to provide the reason within the period of time, service provider computer 210 may terminate the temporary exception and may throttle the client traffic.

At operation 618, service provider computer 210 may select to throttle the traffic of one or more of the clients. For example, service provider computer 210 may select the first client because that client's traffic volume exceeds the first dynamic throttle threshold and no temporary excess is allowed. However, service provider computer 210 may further apply additional logic to throttle traffic of other clients instead of or in addition to the traffic of the first client. In this way, service provider computer 210 may manage the traffic to meet various requirements of the clients. As such, service provider computer 210 may use various factors, as the ones described above, to select, for example, the first client, second client, and/or other clients. To illustrate, if the second client is not in excess, service provider computer 210 may lower the second dynamic throttle threshold for that second client by a certain amount and increase the first dynamic throttle threshold of the first client by that amount. In this way, the traffic of the first client may not be throttled. In comparison, the traffic of the second client may or may not be throttled based on whether the second volume exceeds the adjusted second dynamic throttle threshold or not. In another example, the first client may be on the preferred client list, whereas the second client may be on the non-preferred client list. As such, instead of throttling the traffic of the first client, service provider computer 210 may throttle the traffic of the second client and may increase the first dynamic throttle threshold.

At operation 620, service provider computer 210 may throttle the traffic of the selected client(s). For example, if the first client was selected at operation 618, service provider computer 210 may throttle the traffic of the first client such that the first volume becomes lower than the first dynamic throttle threshold. Similarly, if the second client was selected at operation 618, service provider computer 210 may throttle the traffic of the second client.

Figure 7:
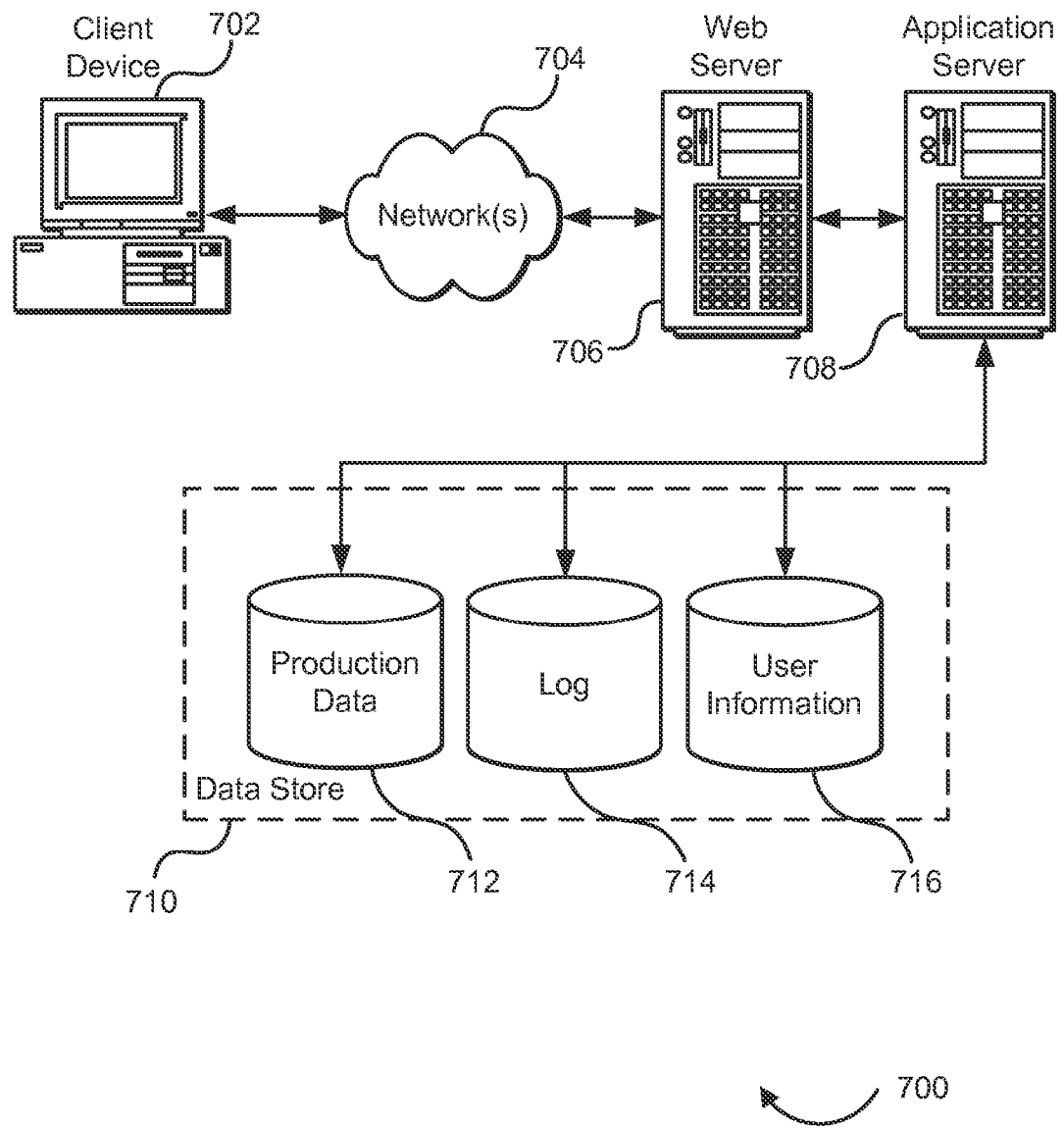
FIG. 7 illustrates an environment in which various embodiments can be implemented.

Turning to FIG. 7, that figure illustrates aspects of an example environment 700 capable of implementing the above-described structures and functions. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network(s) 704 and convey information back to a user of the device. Examples of such client devices include personal computers, cell phones, handheld messaging devices, laptop computers, set-top boxes, personal data assistants, electronic book readers, or any other computing device. Network(s) 704 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between client device 702 and application server 708, can be handled by the Web server. It should be understood that the Web and application servers are not required and are merely example components, as structured code discussed herein can be executed on any appropriate device or host machine as discussed elsewhere herein.

Data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in data store 710. Data store 710 is operable, through logic associated therewith, to receive instructions from application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on client device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of environment 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a service provider computer, records associated with items offered at an electronic marketplace, wherein access to the records is managed at least in part by a throttle service of the service provider computer;
   generating, by the service provider computer, a first dynamic threshold for throttling first method calls from a first client device based at least in part on first method calls received from the first client device, the first method calls for accessing first records associated with items of the first client device;
   generating, by the service provider computer, a second dynamic threshold for throttling second method calls from a second client device based at least in part on second method calls received from the second client device;

generating, by the service provider computer, a third threshold that identifies a limit for responding to the first method calls from the first client device and the second method calls from the second client device, the third threshold generated based at least in part on computing resources available to respond to the first method calls and the second method calls;

receiving, by the service provider computer from the first client device, a new method call requesting at least a subset of the first records;

determining, by the throttle service, that a first number of first total method calls including the new method call received from the first client device exceeds the first dynamic threshold;

determining, by the throttle service, whether a total number of the first number of the first total method calls received from the first client device and of a second number of second total method calls received from the second client device is less than the third threshold;

based at least in part on the first number exceeding the first dynamic threshold and the total number being less than the third threshold, adjusting, by the throttle service, the first dynamic threshold by a first threshold amount and the second dynamic threshold by a second threshold amount, the second threshold amount based at least in part on the first threshold amount; and providing, by the service provider computer, the subset of the first records to the first client device based at least in part on the first dynamic threshold being adjusted.

2. The computer-implement method of claim 1, wherein the third threshold is generated based at least in part on available resources to the throttle service for responding to potential method calls.

3. The computer-implement method of claim 1, wherein the first dynamic threshold is further adjusted based at least in part on a determination that the second number of the second total method calls received from the second client device exceeds the second dynamic threshold.

4. The computer-implement method of claim 1, wherein the first dynamic threshold is further adjusted based at least in part on an expected change to the first number of the first total method calls received from the first client device.

5. A computer-implemented method, comprising:
generating, by a computer system configured with executable instructions, a first threshold and a second threshold for a client device, the first threshold and the second threshold being configured to enable throttling of traffic associated with method calls of the client device, the method calls for requesting access to a network-based resource;

determining, by the computer system and in response to a subsequent method call for requesting access to the network-based resource received from the client device, that a volume of traffic associated with the client device and corresponding to the subsequent method call is larger than the first threshold and that a total volume of traffic associated with the client device and another client device is smaller than the second threshold;

based at least in part on the volume exceeding the first threshold and the total volume being less than the second threshold, adjusting the first threshold and a third threshold, the third threshold generated for the other client device and adjusted based at least in part on the adjusting of the first threshold; and throttling, by the computer system, the traffic associated with the method call based at least in part on the adjusting of the first threshold and characteristics of the client device.

6. The computer-implement method of claim 5, wherein the characteristics of the client device comprise one or more of a number of placed method calls, a size of the network-based resource being requested, a number of items offered by the client device in an electronic marketplace, an order volume associated with the electronic marketplace for items offered by the client device, or an amount of item categories corresponding to the items offered by the client device in the electronic marketplace.

7. The computer-implement method of claim 5, wherein the characteristics of the client device comprise historical method calls received from the client device, and wherein adjusting the first threshold comprises:
determining a historical volume of traffic based at least in part on an analysis of the historical method calls received from the client device; and
updating the first threshold as a function of the historical volume.

8. The computer-implement method of claim 5, wherein the characteristics of the client device comprise item provider features that impact the traffic associated with the method calls of the client device.

9. The computer-implement method of claim 5, further comprising:
allowing the volume of the traffic corresponding to the subsequent method call to exceed the first threshold for a period of time;
requesting the client device to provide a reason for exceeding the first threshold; and
adjusting the first threshold based at least in part on receiving the reason within the period of time and based at least in part on the reason.

10. The computer-implement method of claim 5, wherein the third threshold is configured to enable throttling of traffic associated with other subsequent method calls of the other client device for requesting access to the network-based resource.

11. The computer-implemented method of claim 10, further comprising maintaining the first threshold while adjusting the third threshold.

12. The computer-implemented method of claim 5, wherein the second threshold is generated based at least in part on available bandwidth to respond to potential traffic associated with potential method calls from client devices for accessing the network-based resource.

13. The computer-implemented method of claim 5, wherein throttling the traffic corresponding to the method call comprises denying access to information at the network-based resource in response to the subsequent method call.

14. A system, comprising:
a memory that stores computer-executable instructions; and
a processor configured to access the memory and to execute the computer-executable instructions to collectively at least:
generate a first threshold for a first client device, the first threshold being configured to allow throttling of first traffic associated with first method calls of the first client device, the first method calls for requesting first information at a network-based resource;
generate a second threshold for a second client device, the second threshold being configured to allow throttling of second traffic associated with second method calls of the second client device, the second method calls for requesting second information at the network-based resource;

based at least in part on a determination that a volume of the first traffic exceeds the first threshold and that a total volume of the first traffic and the second traffic does not exceed a third threshold, update the first threshold based at least in part on a first characteristic of the first client device, a second characteristic of the second client device, and an update to the second threshold; and throttle the first traffic based at least in part on the first threshold being updated.

15. The system of claim 14, wherein the update to the second threshold comprises a threshold amount, and wherein the first threshold is updated by the threshold amount.

16. The system of claim 14, wherein the first traffic is throttled based at least in part on a determination that a volume of the second traffic exceeds the second threshold.

17. The system of claim 14, further comprising:
identifying a rate at which a first volume of the first traffic exceeds the first threshold over time; and
adding the first client device to a list of client devices based at least in part on the identified rate.

18. The system of claim 17, wherein the list is a preferred client list if the rate is lower than a particular frequency, and wherein the computer-executable instructions further comprise computer-executable instructions that, when executed by the at least one processor, cause the system to:
allow a volume of the first traffic of the first client device to exceed the first threshold; and
throttle the second traffic of the second client device in response to allowing the volume to exceed the first threshold.

19. The system of claim 17, wherein the list is a non-preferred client list if the rate is higher than a predefined frequency, and wherein the computer-executable instructions further comprise computer-executable instructions that, when executed by the at least one processor, cause the system to:
allow a volume of the second traffic of the second client device to exceed the second threshold; and
throttle the first traffic of the first client device in response to allowing the volume of the second traffic to exceed the second threshold.

20. A non-transitory computer-readable storage medium storing computer-executable instructions that, when executed by a computer system, configures the computer system to perform operations comprising:
identifying traffic associated with method calls of a client device for a network-based resource;
determining available resources to respond to the method calls of the client device;
generating a threshold based at least in part on the traffic associated with the method calls and a characteristic of the client device, the threshold being configured to allow throttling of the traffic associated with the method calls;
based at least in part on a determination that a volume of the traffic of the client device exceeds the threshold and that a total volume of total traffic of the client device and another client device does not exceed a global threshold, updating the threshold based at least in part on the characteristic of the client device and based at least in part on an update to another threshold of the other client device; and
determining whether to throttle the traffic of the client device based at least in part on the threshold being updated.

21. The non-transitory computer-readable storage medium of claim 20, wherein the threshold comprises a first threshold and a second threshold, wherein the first threshold is configured to allow throttling the traffic based at least in part on calls per unit of time, and wherein the second threshold is configured to allow throttling of the traffic based at least in part on a burst rate.

22. The non-transitory computer-readable storage medium of claim 20, wherein updating the threshold comprises increasing the threshold in response to identification of a change in the characteristic of the client device.

23. The non-transitory computer-readable storage medium of claim 20, further comprising instructions that, when executed by the computer system, further configure the computer system to perform operations comprising:
providing the client device with information indicative of the threshold;
receiving, from the client device, a script configured to allow placing the method calls; and
determining that the script has been updated based at least in part on the update to the threshold.

24. The non-transitory computer-readable storage medium of claim 20, further comprising instructions that, when executed by the computer system, further configure the computer system to perform operations comprising notifying the client device that a volume of the traffic exceeds the threshold based at least in part on an automatic notification system.

* * * * *